United States Patent Office 2,905,633
Patented Sept. 22, 1959

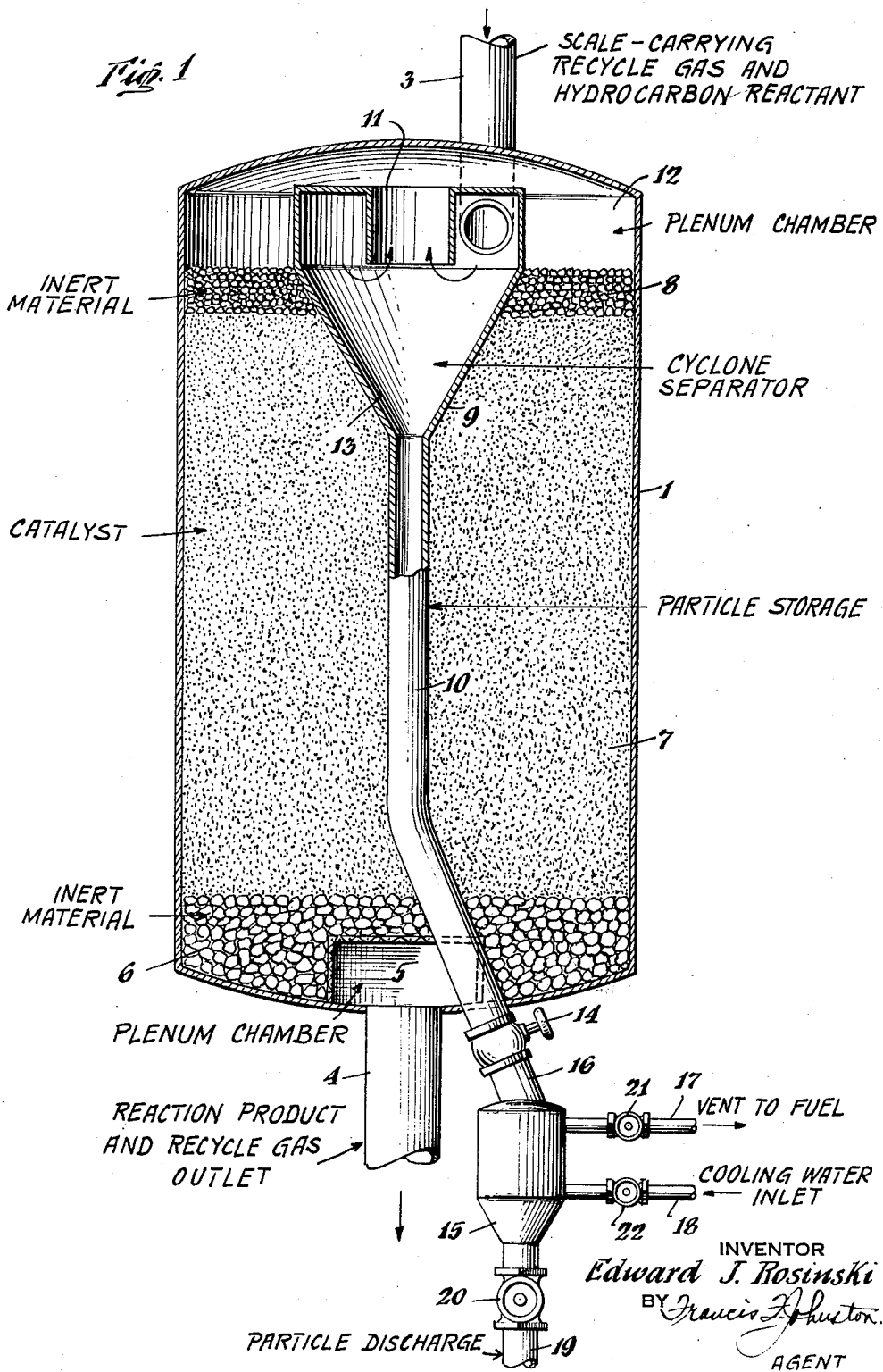

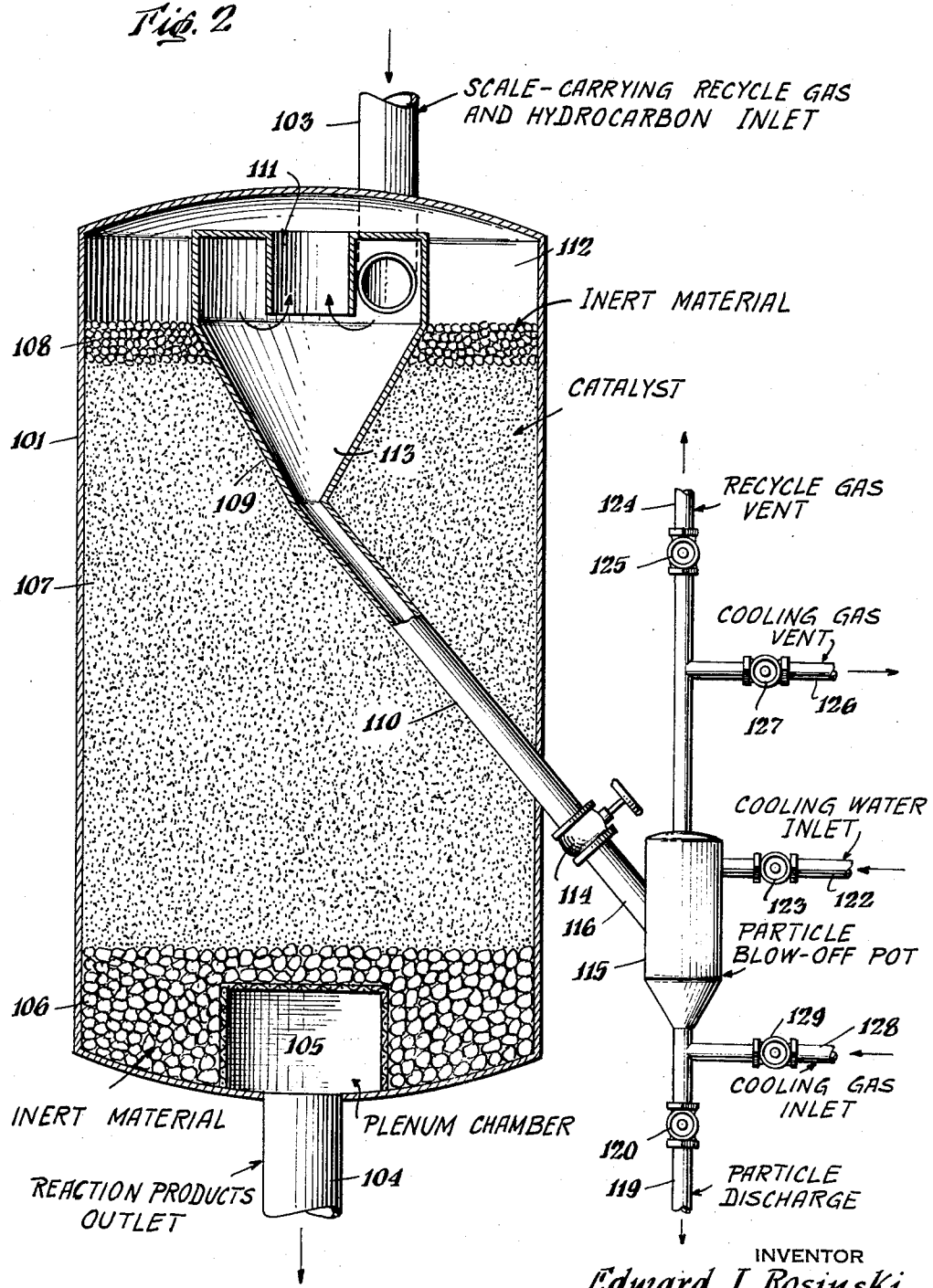

2,905,633

METHOD AND APPARATUS FOR HYDROCARBON CONVERSION EMPLOYING HYDROCARBON REACTANT AND RECYCLE GAS CONTAINING SOLID PARTICLES

Edward J. Rosinski, Almonesson, N.J., assignor to Socony Mobil Oil Company, Inc., a corporation of New York Application July 12, 1956, Serial No. 597,403

2 Claims. (Cl. 208—146)

The present invention relates to hydrocarbon conversions occurring in the presence of recycle gas and, more particularly, to hydrocarbon conversions taking place in the presence of recycle gas carrying particles of metal or metalloid ranging in size from dust to particles having one dimension of two to three or more inches.

While at the present time the most important hydrocarbon conversions which take place in the presence of recycled gas are probably those in which a hydrogen-containing gas is recycled for the effect of the contained hydrogen upon the course of the reaction, there are other hydrocarbon conversions in which a gas is recycled for the purpose of raising the temperature or lowering the temperature of the reaction zone. The present invention is directed to those hydrocarbon conversions in which a hydrocarbon or a mixture of hydrocarbons is contacted with a particle-form solid catalyst in a static bed in the presence of a recycled gas which can affect the reaction or the condition of the catalyst or can be employed for purposes other than that of entering into or affecting the reaction or the condition of the catalyst.

Exemplary of reactions in which the recycle gas affects the reaction are hydrogenation of hydrocarbons including hydrodesulfurization and hydrodenitrogenation, hydrocracking, and hydroforming or reforming.

The tendency, at the present time, appears to be that of extending treatment of hydrocarbon mixtures such as mineral oil and mineral oil fractions with hydrogen. Since a large part of the cost of treatment of hydrocarbon mixtures with hydrogen arises from the cost of the hydrogen when produced solely for the purpose of supplying the manufactured hydrogen to another operation, every effort is made to secure the necessary hydrogen from the reaction itself or from a concomitant reaction. Thus, in the reforming or hydroforming of naphthas it is essential to recycle the hydrogen-containing gas. Furthermore, it can be necessary to introduce some of the hydrogen produced in a reforming reaction into another reactor, such as one in which hydrocracking is being carried out in order to reduce the cost of the latter operation. However, some of the stocks which are being hydroformed can produce products which corrode the metal of the reactor in which the reaction is taking place or in the pipes and conduits through which the gaseous phase passes to such an extent that particles of the products of corrosion are entrained by the gas stream and carried into the reactors to which the gas is circulated. Such a condition arises when sulfur containing hydrocarbon stocks are treated, for example, in the presence of a reforming catalyst which converts the sulfur compounds of the feed to hydrogen sulfide while reforming the hydrocarbons.

Thus, for example, it has been found that, during the reforming of hydrocarbon mixtures containing sulfur, although in many instances the hydrogen sulfide produced in the reforming reaction only amounts to about 0.04 volume percent of the recycle gas, nevertheless scale is formed to such an extent and picked-up or entrained in the recycle gas to the extent that a crust one-half inch thick is deposited in a few days on the surface of the bed of catalyst in the reactor to which the gas is circulated.

While some of the scale is in the form of particles having one dimension relatively large, say in excess of one inch and as much as three inches, a large proportion of the particles are in the size range of dust, i.e., minus 250 mesh. Although the large particles form a crust on the surface of a static bed of catalyst, it was found that the increased pressure drop was due primarily to the sifting of the dust-like particles of the scale into the catalyst bed. The accumulation of scale in the catalyst bed can increase the pressure drop to a level of about four times normal in a few days although the crust formed of large pieces of scale on the upper surface of the static bed of catalyst be only about one-half inch thick. When the pressure drop across the static bed of catalyst increases to about four times normal it becomes impractical to continue the operation.

Removal of the entrained solid particles before entrance of the gas into the reactor can be accomplished but at excessive cost. Since the reactor for hydroforming, hydrocracking and similar hydrocarbon conversions is operated at pressures of 500 to 2500 pounds per square inch gauge (p.s.i.g.) the recycle gas must be under reactor pressure of 500 to 2500 or more pounds per square inch before being introduced into the reactor. Consequently, equipment for the removal of entrained particles outside of the reactor must have a wall thickness to withstand pressure differentials of the order of 500 to 2500 or more pounds per square inch (p.s.i.). Furthermore, such equipment would be subjected to stresses due to uneven cooling of the windward side and the lee side during a high wind or rainstorm. As a result, the cost of equipment for the removal of entrained particles from circulated gas before the gas enters the reactor becomes excessive. However, these difficulties are overcome by placing the unit for the removal of entrained particles from recycled gas within the reactor in which the recycled gas is to be used and periodically or substantially continuously removing the disengaged particles.

In general, the present invention provides for placing a cyclone separator within the reactor above the bed of static catalystic material, passing the recycled gas and vapors of a hydrocarbon reactant through the cyclone separator wherein the entrained particles are disengaged and drop into the draw-off leg while the cleaned recycle gas and hydrocarbon reactant vapors flow into a plenum chamber. From the plenum chamber the mixture of recycle gas and hydrocarbon to be catalytically converted passes through the static bed of catalyst to the reactor product outlet and thence to separators, fractionators and the like.

The cyclone is fabricated in the conventional manner of metal of minimum thickness. Since the pressure within and without the cyclone is substantially the same and since the cyclone is surrounded by gases and vapors at substantially the same temperature and not subjected to the fluctuating temperatures of the air without the reactor, the wall thickness of the cyclone can be a minimum.

Since the cyclone separator per se is not a part of this invention and since the structure and mode of operation is widely known, it is believed unnecessary to describe a cyclone separator in detail. It is believed sufficient to state that a cyclone separator is so constructed that gas enters tangentially, and leaves the separator at the center thereof. The entrained particles disengage from the gas stream, drift toward the periphery of the cyclone and drop or slide into the draw-off leg.

The advantages of the present invention and the novelty thereof will become apparent from the following description taken in conjunction with the drawings in which:

Figure 1 is a vertical section of a reactor having a static bed of catalyst and a superposed cyclone separator for the removal of entrained particles wherein provision is made for gravity flow of the accumulated particles through the draw-off leg and periodic draw-off of disengaged particles; and Figure 2 is a vertical section of a reactor having a static bed of catalyst and a superposed cyclone separator for the removal of entrained particles wherein provision is made for substantially continuous or intermittent draw-off of the disengaged particles under a pressure differential.

Referring now to Figure 1 in which the reactor is designated 1. Reactor 1 is of any suitable design generally insulated and provided with a hydrocarbon reactant and recycle gas inlet 3 and a products outlet 4. The bottom of the reactor preferably is filled with inert material, such as alumina pebbles which preferably are of graded size from pebbles about three-fourths of an inch in diameter to pebbles about one-fourth of an inch in diameter, the largest pebbles at the bottom surrounding plenum chamber 5. Thus, for example, the base of the reactor to within about 6 inches of the bottom of the bed of catalyst is filled with alumina balls or pebbles about three-fourths of an inch in diameter. Upon these pebbles is placed a layer about two inches thick of alumina balls or pebbles about three-eighths of an inch in diameter. Upon the three-eighth inch pebbles is placed a one inch layer of inert balls or pebbles about one-fourth of an inch in diameter and upon the latter is placed a three inch layer of tabular alumina crushed to pass a screen having openings of about one-fourth inch. In Figure 1 this inert material is designated generally as 6.

A bed 7 of catalyst is placed upon the inert material disposed in the bottom of the reactor as hereinbefore described. Alternatively, the bed of catalyst can be supported upon a suitably supported foraminous plate. Upon the upper surface of the bed of catalyst a layer 8, graduated particles of inert material, such as described hereinbefore, is placed.

The cyclone separator 9 having particle storage leg 10 is positioned in the reactor to provide for mixing of the gaseous discharge of the reactor with the hydrocarbon reactant entering the reactor. Preferably, the cyclone separator is concentric with the vertical axis of the reactor. The recycle gas and hydrocarbon reactant vapors flow along inlet 3 and enter cyclone separator 9 tangentially with the wall of the cyclone. The centrifugally cleaned gaseous mixture, i.e., the mixture of recycle gas and hydrocarbon reactant vapors from which particles have become disengaged leaves the cyclone through axial cyclone outlet 11. In effect it is preferred that the cleaned recycle gas and hydrocarbon reactant enter plenum chamber 12.

It will be noted that in the illustrative drawings Figures 1 and 2 the cyclone separator is positioned in the reactor so that the drop-out chamber 13 is below the level of the beds of inert material and catalyst 8 and 7, respectively. This is the preferred location of the separator since it conserves the height of the unit. However, the advantages of equalized pressure and uniform temperature and hence minimum wall thickness are present when the cylone is mounted entirely above the level of the beds of inert material and catalyst.

The centrifugal effect produced by the passage of the mixture of recycle gas and hydrocarbon reactant vapors around the separator at rates which often approach 80 feet per second cause the entrained particles to drop out of the gas stream and accumulate in particle storage leg 10.

It is not important that storage leg 10 extend to the bottom of the reactor. Storage leg 10 extends exterior of the reactor at any point which is convenient. The choice of the point at which the storage leg extends though the wall of the reactor is primarily dependent upon the need to provide free flow of particles through the leg to the blow-off valve 14.

Storage leg 10 discharges into a particle discharge pot 15 through line 16. Discharge pot 15 is provided with a vent 17 to the refinery fuel line. Any reactor gas flowing with the disengaged particles is vented through usually to the refinery fuel line (not shown) or to the suction side of the recycle gas compressor. Discharge pot 15 is provided with an inlet for heat transfer medium 18. A heat transfer medium, for example an inert gas but preferably water, is introduced into discharge pot 15 through inlet 18. When a gas is the cooling medium, it is vented through line 17. When water is the cooling medium, it is discharged together with the disengaged particles through line 19 having valve 20.

Briefly, the operation of the reactor with the enclosed cyclone separator is as follows:

A hydrocarbon reactant and recycle gas, at reactor temperature and pressure, carrying solid particles flow through line 3 into cylone separator 9. The particles drop down into storage leg 10 while the cleaned vapor stream flows from the cyclone separator through outlet 11 into plenum chamber 12. The cleaned recycle gas and hydrocarbon reactant flow from plenum chamber 12 downwardly through inert material 8 and catalyst bed 7 to plenum chamber 5. From plenum chamber 5 the reaction products produced by contact of the hydrocarbon reactant with the catalyst flow through reactor outlet 4 to separating, fractionating and similar units (not shown).

The disengaged particles of solids separated in the cyclone drop into particle storage leg 10 and flow downwardly under control of valve 14 through line 16 into discharge pot 15. Before opening valve 14 discharge pot 15 is vented to about atmospheric pressure. Valve 14 is then opened with valves 20, 21 and 22 closed and the particles in leg 10 discharged in whole or in part into pot 15. Valve 14 is then closed and pot 15 vented through line 17 under control of valve 21. When the pressure in discharge pot reaches atmospheric, valve 21 is closed and valve 22 opened. When insert gas is the cooling medium, valve 21 is open to permit circulation of the cooling medium. When water is the cooling medium, there can be direct heat exchange or indirect heat exchange. It will be recognized that in the drawing Figure 1 direct heat exchange is provided. This permits not only cooling of the disengaged hot particles but also flushing of pot 15 with the water to remove the particles from the pot. Steam generated through the medium of the heat exchange can be used for any purpose for which low pressure steam is suitable and is vented from pot 15 by means not shown. Since it is preferable to use hot water to cool the particles, the steam produced can be used to heat the cooling water. The cooled particles are discharged from the pot through line 19 under control of valve 20. Those particles which do not flow out of pot 15 can be flushed therefrom with water introduced through inlet 18.

The primary difference between the system illustrated in Figure 2 and that illustrated in Figure 1 is provision for blowing the stored disengaged particles from the storage leg into the discharge pot. Whereas, after venting, discharge pot 15 of Figure 1 will be at reactor pressure after opening valve 125 discharge pot 115 of Figure 2 is at a lower pressure than reactor perssure.

Reactor 101 is provided with a hydrocarbon and scale-carrying recycle gas inlet 103, a products outlet 104 and a products plenum chamber 105. Reactor 101 is also provided with a layer of inert material 106, such as described hereinbefore, a static catalyst bed 107 and a superposed layer of inert material 108.

A cyclone separator 109 or separators of conventional design and of minimum wall thickness is disposed in reactor 101, preferably with the drop-out section and particle storage leg 110 within the beads 107 and 108.

Storage leg 110 discharges into conduit 116 under control of valve 114. Conduit 116 discharges into pot 115.

Discharge pot 115 is provided with discharge conduit 119 having valve 120 thereon. Discharge pot 115 is also provided with cooling gas inlet 128 having valve 129, water inlet 122 having valve 123, recycle gas vent 124 having valve 125 and cooling gas vent 126 having valve 127.

Hydrocarbon reactant at reactor temperature and pressure and recycle gas carrying particles of solid matter ranging in size from minus 250 mesh to particles having one dimension up to three inches or more flow at reactor pressure and temperature, e.g., 1000 p.s.i.g. and 800° F. from a source not shown through inlet 103 into cyclone separator 109. The vapor stream enters the cyclone separator tangentially. The centrifugal forces created cause the entrained particles of solid matter to drop out of the gas stream and accumulate in storage leg 110. The cleaned vapor stream flows from the cyclone separator through axial outlet 111 into plenum chamber 112.

In the plenum chamber 112 the cleaned vapor stream flows downwardly therefrom through the bed of inert material 108 and the bed of catalyst 107.

In passage through the bed of catalyst 107 the hydrocarbon reactant is converted. The products of this conversion flow from catalyst bed 107 downwardly through the bed of inert material 106 to products plenum chamber 105. From products plenum chamber 105 the products flow through products outlet 104 to separation, fractionation and other treatment. Returning now to the cyclone 109, the particles of solid material disengage from the vapor stream, drop through chamber 113 into storage leg 110. Intermittently, but if desired substantially continuously, the disengaged particles of solid material are blown from storage leg 110 into discharge pot 115 in the following manner. With valves 120 in particle discharge conduit 119 closed, with valve 123 in cooling water inlet 122 closed, and with valve 125 in recycle gas vent 124 closed, inert gas is introduced into discharge pot 115 through cooling gas inlet 128 under control of valve 129 and discharged through cooling gas vent 126 under control of valve 127. After a discharge pot 115 has been purged, valves 129 and 127 are closed and valves 125 and 114 are open. Since discharge pot 115 is at a lower pressure than reactor 101, there is a differential in pressure of several hundred pounds. As a result of this differential in pressure the disengaged particles of solid material which have accumulated in leg 110 are blown therefrom through conduit 116 into discharge pot 115. When storage leg 110 is empty, valves 114 and 125 close and valves 129 and 127 open to admit and discharge respectively a cooling and purge gas. When discharge pot 115 has been purged valves 127 and 129 are closed and valve 123 is opened to admit cooling water. Although the heat exchange between the cooling water and the hot disengaged solid particles can be indirect, it is preferred to have the heat exchange reaction direct. Accordingly, the cooling water is admitted through line 122 under control of valve 123 until the disengaged particles of solid material in discharge pot 115 are cooled to temperatures of 200° F. or less.

In the cooling of the disengaged particles of solid material with the cooling water steam is produced and this steam can be used for any purpose for which low pressure steam is suitable. Since it is preferred to use hot water for cooling, the disengaged particles in discharge pot 115, the low pressure steam produced in discharge pot 115 by the contact of cooling water with the hot disengaged particles of solid material therein can be withdrawn from discharge pot 115 through a line not shown and the steam used to heat the water subsequently used to cool the disengaged particles of solid material.

When the disengaged particles of solid material are cooled valve 120 in discharge conduit 119 is opened and the cooled disengaged particles of solid material allowed to flow therefrom. Those particles of solid material which do not flow from pot 115 can be flushed therefrom with water from inlet 122 under control of valve 123.

After flushing discharge pot 115, valves 123 and 120 are closed and discharge pot 115 is purged with an inert gas introduced through line 128 under control of valve 129 and vented through outlet 126 under control of valve 127. The discharge pot is then ready for the receipt of further amounts of hot disengaged particles of solid material which have accumulated in storage leg 110.

From the foregoing description, those skilled in the art will recognize that the present invention provides a method for hydrocarbon coonversion employing a recycle gas containing entrained particles of solid material varying in size from dust-like particles to particles having one dimension up to 3 or more inches in which a mixture of hydrocarbon reactant at reaction temperature and pressure and a recycle gas containing entrained particles of solid material is passed through a cyclone separator in which entrained particles of solid material are disengaged to provide a cleaned vapor stream and the cleaned vapor stream flows from the cyclone separator into the aforesaid plenum chamber. The mixture of hydrocarbon reactant and cleaned recycle gas, i.e., the cleaned vapor stream, then flows downwardly through a static bed of catalytic material through a products plenum chamber and thence through a products outlet to separation, fractionation and the like. The process also provides for removal of the disengaged particles of solid material from the cyclone separator storage chamber to a discharge pot wherein the pot disengaged particles of solid material are cooled to temperatures below about 300° F. and then discharged to waste.

Those skilled in the art will also recognize that the present invention provides for a reactor having a products outlet and an enclosed cyclone separator of minimum wall thickness disposed within said reactor. The reactor is also provided with a hydrocarbon reactant and recycle gas inlet directly connected tangentially with a cyclone separator to create the centrifugal force required to drop from the recycle gas stream particles of solid material ranging in size from minus 250 mesh to particles having one dimension of 3 inches or more. The present invention also provides a reactor in which there is a disengaged particles storage leg and draw-off leg discharging into a discharge pot provided with means for introducing purged gas, means for introducing heat transfer medium, means for venting said purged gas and recycle gas and means for withdrawing cooled disengaged particles of solid material.

I claim:

1. In the method of hydrocarbon conversion which comprises mixing a recycle gas and hydrocarbon reactant at reaction temperature in excess of 300° F. and reaction pressure of at least 500 pounds per square inch to obtain a charge mixture containing entrained catalyst bed interstices filling particles of solid foreign material passing a 250-mesh screen and particles of solid foreign material having diameters up to three inches, passing said charge mixture containing the aforesaid entrained particles of solid foreign material through a static bed of catalyst in a reaction zone, and withdrawing reaction products from said reaction zone whereby the pressure drop through said bed of catalyst builds up to impractical proportions through infiltration of catalyst bed interstices filling particles from said charge mixture into said static bed of catalyst, the improvement which comprises subjecting said charge mixture containing entrained catalyst bed interstices filling particles of foreign material passing a 250-mesh screen and particles of solid foreign material having diameters up to about three inches in said reaction zone at reaction temperature in excess of 300° F. and at pressure of at least 500 pounds per square inch to centrifugal force to separate particles of said entrained solid foreign material from said charge mixture and from said static bed of catalyst to provide a cleaned charge mixture and to reduce substantially the pressure drop through said static bed of catalyst, passing said cleaned charge mixture directly through said static bed of catalyst, withdrawing reaction products from said reaction zone, and withdrawing separated particles of solid foreign material devoid of particles of catalyst from said reaction zone.

2. An apparatus for hydrocarbon conversion at a pressure of at least 500 pounds per square inch and a temperature in excess of 300° F. employing a static bed of catalyst and treating a vapor stream containing entrained solid foreign particles having diameters of three inches and less and including particles passing a 250-mesh screen which comprises a vertical cylindrical tank, a charge mixture inlet in the region of the top of said cylindrical tank, a products outlet in the region of the bottom of said cylindrical tank, vapor pervious means positioned contiguous to said products outlet adapted to support a static bed of particle-form solid catalyst and forming between said vapor pervious means and said charge mixture inlet a catalyst zone and superposed plenum chamber, a cyclone separator mounted within said cylindrical tank with a major portion thereof within said catalyst zone, said charge mixture inlet being directly connected in a fluid-tight manner tangentially with said cyclone separator, said cyclone separator having vapor discharge means directly connected with said plenum chamber, said cyclone separator having foreign particle discharge means within said cylindrical tank, and a discharge pot external of said cylindrical tank below the level of the aforesaid foreign particle discharge means, said discharge pot having foreign particle inlet means directly connected with said foreign particle discharge means of said cyclone separator, and heat transfer inlet means.

References Cited in the file of this patent

UNITED STATES PATENTS

| | | |
|---|---|---|
| 2,416,003 | Guyer | Feb. 18, 1947 |
| 2,423,907 | Schulze | July 15, 1947 |
| 2,485,906 | Mills | Oct. 25, 1949 |
| 2,569,865 | Muska | Oct. 2, 1951 |
| 2,631,981 | Watson et al. | Mar. 17, 1953 |
| 2,656,242 | Matheson | Oct. 20, 1953 |
| 2,700,641 | Rehbein | Jan. 25, 1955 |
| 2,721,788 | Schad | Oct. 25, 1955 |
| 2,730,556 | Liedholm | Jan. 10, 1956 |
| 2,731,335 | Odell | Jan. 17, 1956 |
| 2,731,394 | Adams et al. | Jan. 17, 1956 |
| 2,795,489 | Kassel | June 11, 1957 |